US011914838B2

(12) United States Patent
Kalaboukis et al.

(10) Patent No.: US 11,914,838 B2
(45) Date of Patent: Feb. 27, 2024

(54) COMPUTERIZED SYSTEM AND METHOD FOR COLLABORATIVE ELECTRONIC DOCUMENT CREATION

(71) Applicant: YAHOO ASSETS LLC, Dulles, VA (US)

(72) Inventors: Chris Kalaboukis, Los Gatos, CA (US); Sunil Nagaraj, Sunnyvale, CA (US)

(73) Assignee: YAHOO ASSETS LLC, New York, NY (US)

( * ) Notice: Subject to any disclaimer, the term of this patent is extended or adjusted under 35 U.S.C. 154(b) by 0 days.

(21) Appl. No.: 17/029,316

(22) Filed: Sep. 23, 2020

(65) Prior Publication Data

US 2021/0004142 A1    Jan. 7, 2021

Related U.S. Application Data

(63) Continuation of application No. 16/550,366, filed on Aug. 26, 2019, now Pat. No. 10,866,690, which is a continuation of application No. 11/609,300, filed on Dec. 11, 2006, now Pat. No. 10,416,838.

(51) Int. Cl.
| | |
|---|---|
| *G06F 3/048* | (2013.01) |
| *G06F 3/04817* | (2022.01) |
| *G06F 3/0481* | (2022.01) |
| *G06Q 10/107* | (2023.01) |
| *G06F 3/01* | (2006.01) |

(52) U.S. Cl.
CPC ........ *G06F 3/04817* (2013.01); *G06F 3/0481* (2013.01); *G06Q 10/107* (2013.01)

(58) Field of Classification Search
CPC .. G06F 3/0482; G06F 3/04817; G06Q 10/107
See application file for complete search history.

(56) References Cited

U.S. PATENT DOCUMENTS

| | | | |
|---|---|---|---|
| 6,385,306 B1 | 5/2002 | Baxter, Jr. | |
| 7,010,752 B2* | 3/2006 | Ly | G06Q 10/10 |
| | | | 715/752 |
| 7,076,730 B1 | 7/2006 | Baker | |
| 7,130,885 B2 | 10/2006 | Chandra et al. | |
| 7,185,285 B2 | 2/2007 | Van Dok et al. | |
| 7,353,252 B1* | 4/2008 | Yang | G06Q 10/10 |
| | | | 709/204 |
| 7,370,269 B1* | 5/2008 | Prabhu | G06F 16/954 |
| | | | 715/201 |
| 7,386,535 B1* | 6/2008 | Kalucha | G06Q 10/06 |
| 7,503,007 B2 | 3/2009 | Goodman et al. | |
| 7,676,542 B2* | 3/2010 | Moser | G06Q 10/107 |
| | | | 709/204 |
| 7,823,055 B2 | 10/2010 | Sull et al. | |
| 8,321,786 B2 | 11/2012 | Lunati | |
| 2003/0065941 A1 | 4/2003 | Ballard et al. | |

(Continued)

*Primary Examiner* — Nicholas Augustine
(74) *Attorney, Agent, or Firm* — James J. DeCarlo; Greenberg Traurig, LLP

(57) ABSTRACT

A device, system, and method are directed towards facilitating composing, editing, and displaying a message that includes text and graphics inline. An edit window provides a mechanism for editing the text inline. The message, including text and graphics, may be sent to a remote device. The remote device may display the message, and edit the text and graphics inline, and send a reply message to the original sender.

15 Claims, 5 Drawing Sheets

(56) References Cited

U.S. PATENT DOCUMENTS

| | | | |
|---|---|---|---|
| 2004/0117358 A1* | 6/2004 | von Kaenel | G06Q 40/08 |
| 2005/0234943 A1* | 10/2005 | Clarke | H04L 67/131 |
| 2006/0005163 A1* | 1/2006 | Huesken | G06F 9/465 |
| | | | 717/107 |
| 2006/0026502 A1* | 2/2006 | Dutta | G06F 40/166 |
| | | | 715/201 |
| 2006/0041752 A1* | 2/2006 | Tuvell | H04L 12/1822 |
| | | | 713/171 |
| 2006/0053380 A1* | 3/2006 | Spataro | G06Q 10/10 |
| | | | 709/204 |
| 2006/0075036 A1 | 4/2006 | Malik | |
| 2006/0101071 A1* | 5/2006 | Henderson | H04L 51/08 |
| 2006/0117247 A1* | 6/2006 | Fite | G06Q 10/10 |
| | | | 715/230 |
| 2006/0168550 A1* | 7/2006 | Muller | G06Q 10/06 |
| | | | 707/999.102 |
| 2007/0118598 A1* | 5/2007 | Bedi | G06Q 10/107 |
| | | | 709/204 |
| 2009/0138808 A1* | 5/2009 | Moromisato | G06Q 10/10 |
| | | | 715/758 |
| 2015/0310188 A1* | 10/2015 | Ford | H04L 63/101 |
| | | | 726/28 |
| 2017/0310826 A1* | 10/2017 | Gunasekar | G06Q 10/1095 |

* cited by examiner

COMPUTERIZED SYSTEM AND METHOD FOR COLLABORATIVE ELECTRONIC DOCUMENT CREATION

This patent application claims the benefit of and is a continuation of U.S. patent application Ser. No. 16/550,366, filed on Aug. 26, 2019, which claims priority from Ser. No. 11/609,300, filed on Dec. 11, 2006 now U.S. Pat. No. 10,416,838, which are both incorporated by reference herein in their entirety.

FIELD OF THE INVENTION

The present invention relates generally to electronic messaging and, more particularly, but not exclusively to using images in electronic messages.

BACKGROUND OF THE INVENTION

The Internet and other wired or wireless networks provide a number of mechanisms that allow users to send and receive messages. Email is one such widely used mechanism. Webmail, is a browser-based application that allows users to send or view email messages. Yahoo! mail is an email system that employs webmail clients.

A webmail system typically provides an editor that allows a user to enter text messages. A user can attach files to a message. Attached files, referred to as "attachments," may include photos, drawings, or other types of data. A receiver of a message with an attachment may save the attached file, or open it and view the contents.

The Simple Mail Transfer Protocol (SMTP) is a standard protocol for transporting email messages over the Internet. RFC 2821, available at http://tools.ietf.org/html/rfc2821, describes this protocol. Multipurpose Internet Mail Extensions (MIME) is a standard format used for mail messages on the Internet. MIME, and related protocols, are described in a series of documents: RFC 2045, RFC 2046, RFC 2047, RFC 2048, and RFC 2049, available at http://tools.ietf.org.

Many users desire improved or alternate ways of creating messages that include images, or combinations of text and images. For example, there may be situations when a user may desire to closely integrate text and images. Users generally desire improved or alternate techniques for creating messages that include images. There may be other situations in which existing email or messaging systems do not provide users with the capabilities that they desire. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

Figure 1:
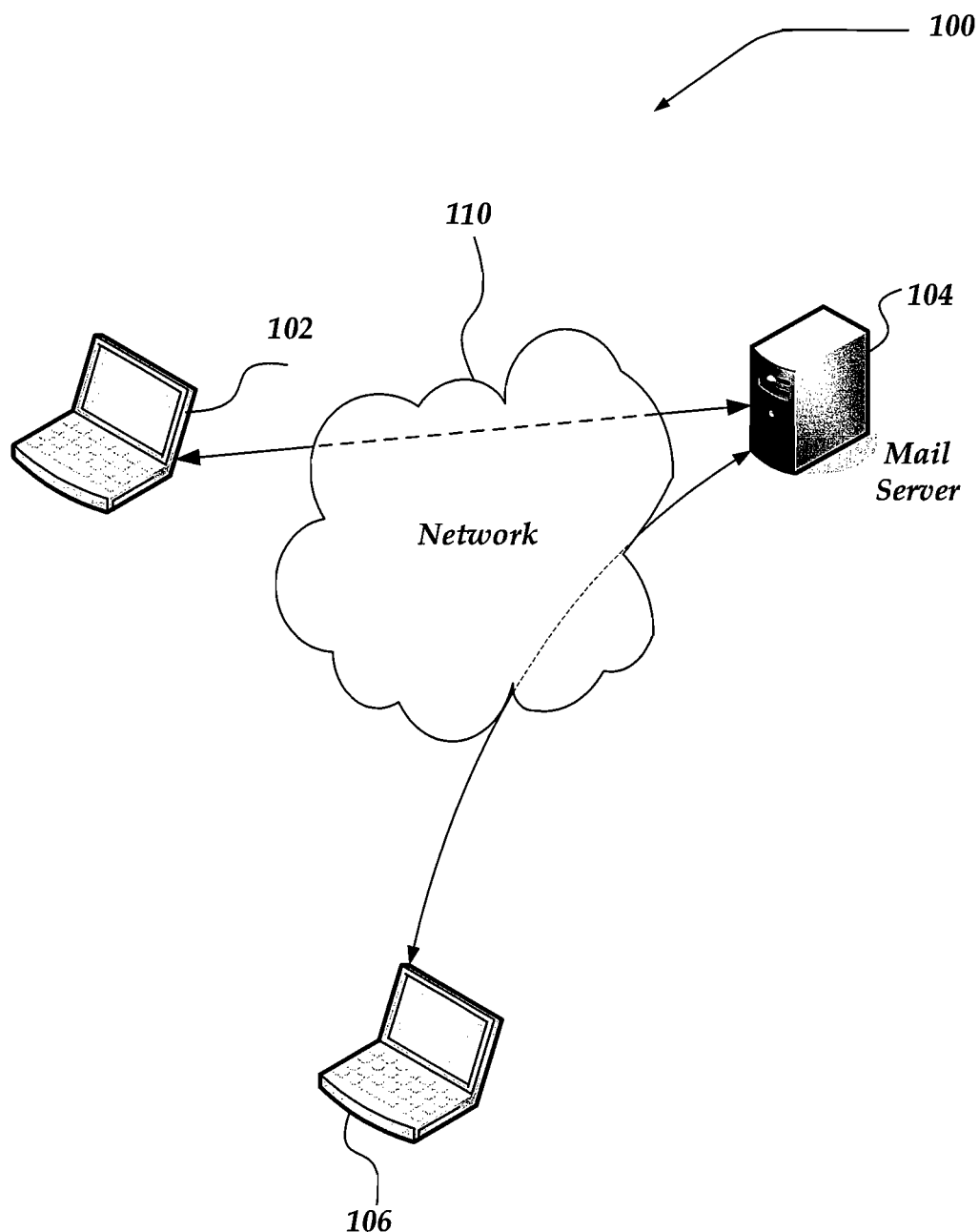
FIG. 1 is a system diagram of one embodiment of an environment in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "receiving" an item, such as a request, response, or other message, from a device or component includes receiving the message indirectly, such as when forwarded by one or more other devices or components. Similarly, "sending" an item to a device or component includes sending the item indirectly, such as when forwarded by one or more other devices or components.

As used herein, the term "client application" refers to an application that runs on a client computing device. A client application may be written in one or more of a variety of languages, such as 'C', 'C++', 'J2ME', 'Brew", Java, and the like. Browsers, email clients, text messaging clients, calendars, and games are examples of client applications. A mobile client application refers to a client application that runs on a mobile device.

As used herein, the term "network application" refers to a computer-based application that communicates, directly or indirectly, with at least one other component across a network. Web sites, email servers, messaging servers, and game servers are examples of network applications.

Briefly stated, the present invention is directed towards providing users with a mechanism for exchanging messages that include graphical images. A user may compose a message that integrates text with one or more graphical images. The text and the graphical images may be sent to a receiver, where the message is assembled and displayed to substantially appear as it appeared to the user composing the message. A receiver may edit the graphical images in a manner similar to that used by the original sender.

Systems and methods of the invention may include displaying, at a sending client device, a message body window, editing text within the message body window, editing at least one graphic element within the message body window, generating a message including the text and the graphic element, and sending the message to a receiving client, wherein the message is configured in a format that enables the receiving client to display the text and the graphic element inline in a message body window, and to edit the graphic element inline within the message body window.

Systems and methods of the invention may include use of a browser application to perform any one or more of the actions of displaying the message body window, editing the text within the message body window, and editing the graphic element within the first message body window.

Systems and methods of the invention may include performing the above actions with an email message. A message may be sent to an email server, such as a webmail server. Mechanisms of the invention may include sending the message using SMTP or HTTP, or sending the message in HTTP to a server that forwards the message in SMTP.

Systems and methods of the invention may include creating an attachment including a graphic element, and including the attachment with the message. A receiver may extract the attachment and insert it inline, together with text of the message, or open the attachment in a separate application.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes a client device 102. The system also includes network 110, mail server 104, and a second client device 106.

A variety of client devices may be employed in accordance with the invention. The client devices may include portable devices, digital home clients such as personal computers and media centers, and other client devices. Generally, client devices 102 and 106 may include virtually any computing device capable of receiving and sending a message over a network, such as network 110, or the like. Client device 102 or 106 may be a client device that is configured to be portable. Client device 102 or 106 may have the capability of connecting to a network using wireless technology, wired technology, or a combination of both wired and wireless technologies. Thus, client device 102 or 106 may include virtually any portable or non-portable computing device capable of connecting to another computing device and receiving information. Such devices include portable devices such as cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client device 102 or 106 typically ranges widely in terms of capabilities and features. For example, a cell phone may have a numeric keypad and a few lines of monochrome LCD display on which only text may be displayed. In another example, another cell phone or web-enabled mobile device may have a touch sensitive screen, a stylus, and several lines of color LCD display in which both text and graphics may be displayed.

A web-enabled client device may include a browser application that is configured to receive and to send web pages, web-based messages, and the like. The browser application may be configured to receive and display graphics, text, video, multimedia, and the like, employing virtually any web based language or protocol, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), Asynchronous Javascript and XML (AJAX) and the like, to display and send a message.

Client device 102 or 106 may include one or more other client applications that are configured to receive content from another computing device. The client application may include a capability to provide and receive textual content, graphical content, audio content, video content, and the like. The client application may further provide information that identifies itself, including a type, capability, name, and the like. In one embodiment, client device 102 or 106 may uniquely identify itself through any of a variety of mechanisms, including a phone number, Mobile Identification Number (MIN), an electronic serial number (ESN), or other mobile device identifier.

Client device 102 or 106 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device. However, the present invention is not limited to these message protocols, and virtually any other message protocol may be employed.

Client device 102 or 106 may further be configured to include a client application that enables the end-user to log into an end-user account that may be managed by a network application. Such an end-user account, for example, may be configured to enable the end-user to receive emails, send/receive IM messages, SMS messages, access selected web pages, maintain a digital wallet, or the like.

Network 110 is configured to couple client device 102 or 106, as well as other client devices not illustrated, and their components, with other network devices, such as mail server 104, and the like.

Though for illustrative purposes client devices 102 and 106 are shown employing network 110, in various environments employing the present invention, client devices 102 and 106 may use the same network, different networks, or different networks including a combination of overlapping components and distinct components.

Figure 3:
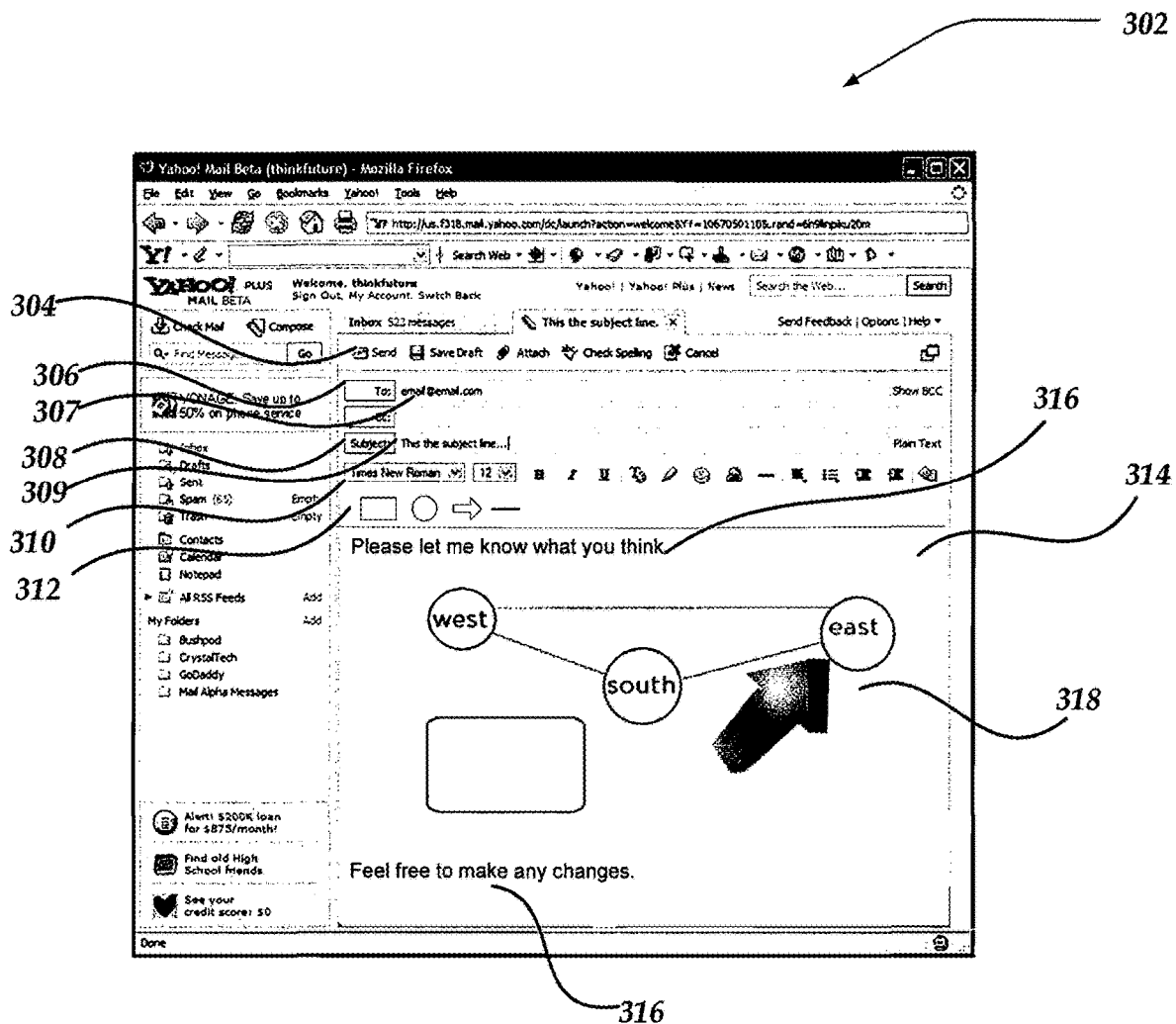
FIG. 3 is a pictorial illustration generally showing one embodiment of a user interface for composing and editing graphical messages.

In one embodiment, mail server 104 is a webmail server. A webmail server may be considered to be a type of web server or a type of email server. A webmail server may communicate with client device 102 or 106 using web protocols such as HTTP. In one embodiment, mail server 104 may send to client device 102 or 106 a web page that is operative to facilitate composing, editing, or viewing a message. The user interface 302 of FIG. 3 is one example of a web page that may be sent from mail server 104. In one embodiment, mail server 104 may receive a message from a client using HTTP, process the message, and forward the message to another client using SMTP. In one embodiment, mail server 104 may receive a message using SMTP, process the message, and forward the message to a client using HTTP.

Network 110 may include any of a variety of wired or wireless sub-networks that may further overlay stand-alone ad-hoc networks, and the like, to provide an infrastructure-oriented connection for client device 102 or 106. Such sub-networks may include mesh networks, Wireless LAN (WLAN) networks, cellular networks, and the like. Additionally, network 110 may connect to mobile devices with a wired connection, such as cable, phone lines, Ethernet wires, and the like. Network 110 may include wide area networks, such as the Internet. The invention may be used either generally with networks, specifically with wireless networks, or with various combinations of wireless and wired networks.

Network 110 may further include an autonomous system of terminals, gateways, routers, and the like connected by wireless radio links, and the like. These connectors may be configured to move freely and randomly and organize themselves arbitrarily, such that the topology of network 110 may change rapidly.

Network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for client devices, such as client device 102 or 106 with various degrees of mobility. For example, network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, network 110 may include virtually any communication mechanism by which information may travel between client device 102 or 106 and another computing device, network, and the like.

Network 110 may further include or employ one or more network gateways (not shown) that serve as intermediaries between client device 102 or 106 and other network devices, such as mail server 104. A network gateway may receive data from a device or network, transform the data, and forward the data to another device or network. A network gateway may perform a transformation in more than one direction. Transformation may, for example, include modifying protocols or communications mechanisms in order to facilitate communication between two devices or two networks, each of which may employ differing protocols. A WAP gateway is one type of network gateway. A WAP gateway may facilitate communication between a first device that uses the Wireless Application Protocol (WAP), and a second device. The second device may, for example, communicate using the HyperText Transfer Protocol (HTTP). An SMS gateway is a network gateway that facilitates communication between a device using the Short Message Service (SMS) protocol and another device, such as one using HTTP. A WAP and SMS gateway combines the features of a WAP gateway and an SMS gateway.

In one embodiment, network 110 may include one or more components of an instant messaging service that operates to facilitate communication of instant messaging between client device 102, mail server 104 and client device 106.

A network enabling any one or more of the above communications may employ any form of computer readable media for communicating information from one electronic device to another. Also, the network may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, the network includes any communication method by which information may travel between client device 102, mail server 104, client device 106, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" include a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

FIG. 1 illustrates two client devices 102 and 106, and one mail server 104. The invention may be practiced in environments having additional client devices. Environments in which the invention may be practiced may include any number of client devices, and processes of the invention may include two-way or multi-way communications, or combinations thereof.

Though FIG. 1 illustrates an embodiment of a system having one mail server 104, the invention is not so limited. Software, hardware, or hardware-software combinations implementing any portion of a mail server may be combined with any other component on a single computing device, or arranged in a different manner among multiple computing devices. Some portion or all of the functionality of any component may be distributed or duplicated among multiple computing devices.

Network devices that may be used to implement mail server 104 may include any computing device capable of communicating with other network devices to enable sending or receiving messages to or from client devices, such as client device 102 or 106. Devices that may operate as these network devices include personal computers desktop computers, multiprocessor systems, microprocessor-based or programmable consumer electronics, network PCs, servers, and the like, or any combination thereof.

Illustrative Client Device Environment

Figure 2:
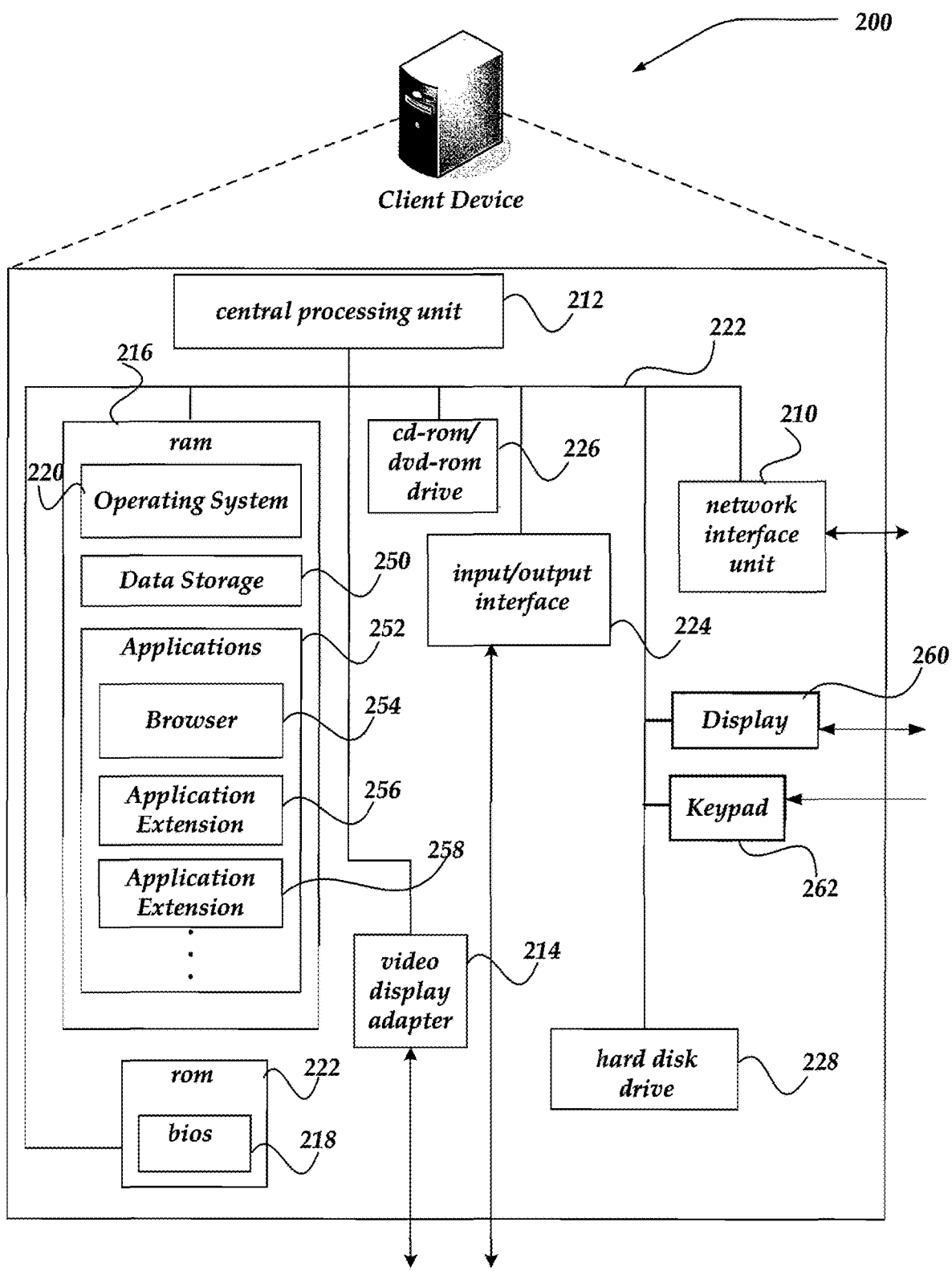
FIG. 2 shows one embodiment of a client device that may be employed in a system implementing the invention.
Figure 4:
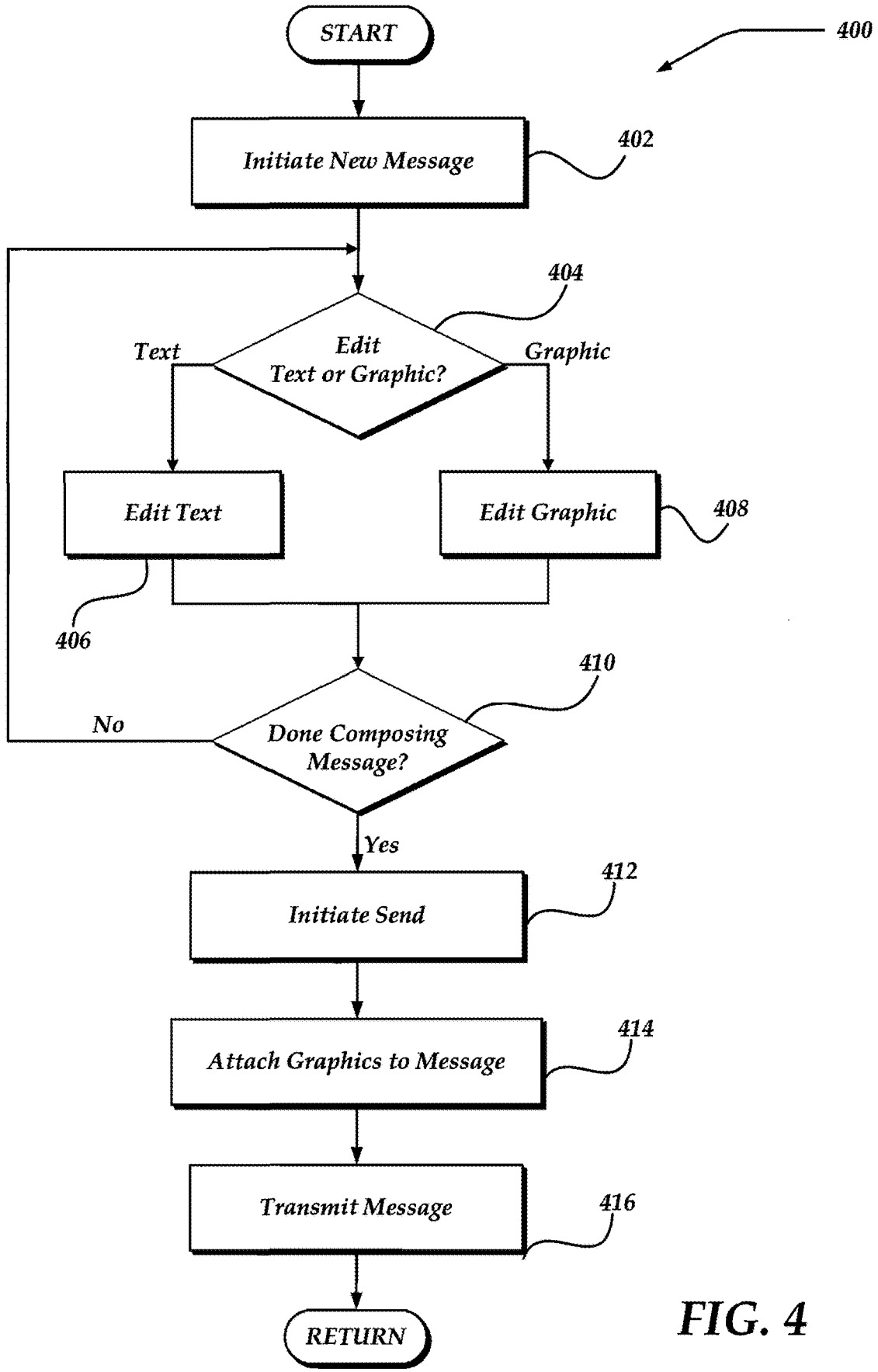
FIG. 4 is a logical flow diagram generally showing one embodiment of a process for creating and sending a graphical message.
Figure 5:
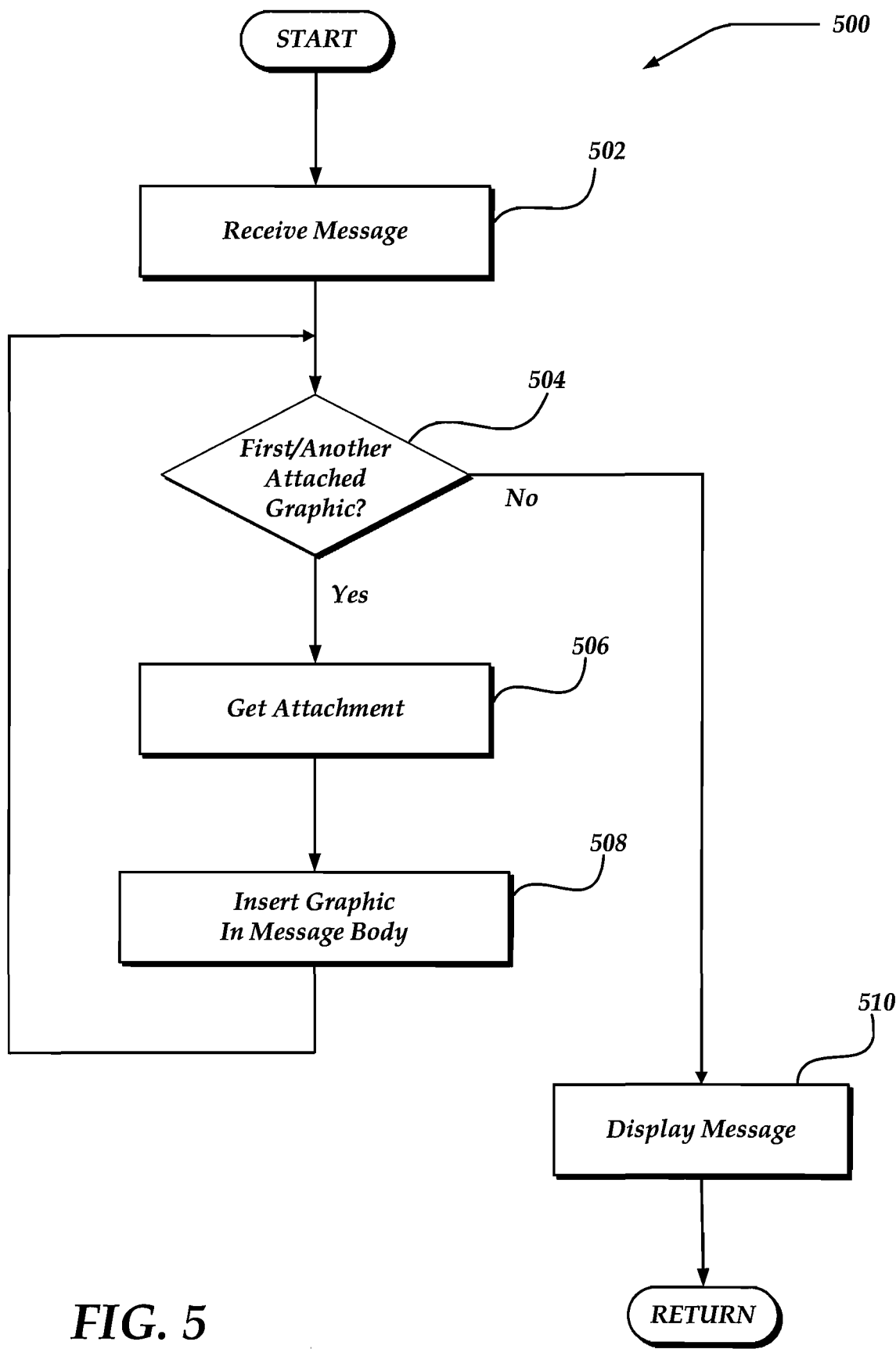
FIG. 5 is a logical flow diagram generally showing one embodiment of a process for receiving and viewing a graphical message.

FIG. 2 shows one embodiment of a client device 200, according to one embodiment of the invention. The embodiment of network device 200 illustrated in FIG. 2 may be used as client device 102 or 106 FIG. 1. Client device 200 may include many more components than those shown. It may also have less than all of those shown. The components shown, however, are sufficient to disclose an illustrative embodiment for practicing the invention. One or more client devices, and the application programs integrated with the devices, may be used to implement the processes of the present invention, as illustrated in FIGS. 3-5 and discussed herein.

Client device 200 includes processing unit 212, video display adapter 214, and a mass memory, all in communication with each other via bus 222. Video display adapter 214 may control signals sent to a display device (not shown) that is integrated with the client device 200 or separate from the client device. The mass memory generally includes RAM 216, ROM 222, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including the TCP/IP protocol. Network interface unit 210 is sometimes known as a transceiver, transceiving device, or network interface card (NIC).

As illustrated, client device 200 may include a display 260 and a keypad 262 or other input device. Display 260 may be a liquid crystal display (LCD), gas plasma, light emitting diode (LED), or any other type of display used with a computing device. Display 260 may also include a touch sensitive screen arranged to receive input from an object such as a stylus or a digit from a human hand. Keypad 262 may comprise any input device arranged to receive input from a user. For example, keypad 262 may include a push button numeric dial, or a keyboard. Keypad 262 may also include command buttons that are associated with selecting and sending messages.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more data storage components 250 may include program code or data used by the operating system 220 or by applications 252. Data may be stored in ram 216 or other storage devices, such as hard disk drive 228. One or more applications 252 and application components are loaded into mass memory and run on operating system 220. Examples of application programs may include, search programs, transcoders, schedulers, calendars, database programs, word processing programs, HTTP programs, customizable user interface programs, IPSec applications, encryption programs, security programs, VPN programs, SMS message clients, IM message clients, email clients, account management and so forth. More detailed discussions of some application programs are included herein.

In one embodiment, applications 252 may include a browser 254. A browser may include program logic that performs actions such as sending requests for web pages, programs, documents, files, and the like. A browser may receive web pages, scripts, programs, documents, files, and the like, and perform one or more actions, such as storing the objects, executing objects, playing audio or video, or displaying all or portions of objects. Web browsers typically use the hyper-text transfer protocol (HTTP) to communicate with web servers. Mozilla Firefox, by the Mozilla Foundation, and Internet Explorer, by Microsoft, are commonly used browser applications.

In one embodiment, applications 252 may include one or more application extensions 256-258. An application extension may include program logic or data that is used to extend the functionality of an application program, such as browser 254. An application extension may add features to an application that support one or more specific functions, such as displaying or editing a type of object. An application extension may be implemented as a plug-in, a program module, executable code, a script, and the like.

Generalized Operation

FIG. 3 is a pictorial illustration of a user interface 302 that may be employed for composing, sending, receiving, or displaying messages in accordance with an embodiment of the invention. User interface 302 may be presented on a display integrated with, or connected to a client device, such as client device 102 or 106 of FIG. 1. In one embodiment, user interface 302 is implemented as a window displayed by a browser application, such as browser 254.

As illustrated in FIG. 3, user interface 302 may include command items, such as send button 304. A command item initiates one or more actions in response to a selection by a user. Command items may be implemented as buttons, menu items, links, and the like. Send button 304 may be used to initiate a command of sending a message, such as an email message.

User interface 302 may include header items, which provide information pertaining to a message. The "To" button 306 and corresponding text box 307 provide a user with a mechanism for specifying message recipients. "Subject" button 308 and corresponding text box 309 provide a mechanism for specifying a subject of a message.

User interface 302 may include one or more text specification items that are used to specify formatting or other characteristics for text in a message. As illustrated, a text command area 310 includes text specification items for specifying font, font size, weight, italicizing, underlining, and the like.

User interface 302 may include one or more graphic specification items that are used to specify characteristics of graphic objects, or perform actions relating to a graphic object. As illustrated, a graphic command area 312 includes graphic specification items such as selection of graphic elements to be included in a graphic, color selection, line weight, and the like. Any of a number of graphic specification items that are used in drawing or painting applications, or the like, may be included in user interface 302.

User interface 302 may include one or more message body windows 314. A message body window, also referred to as a message body area, is used to compose and to view a message, such as an email message. In one embodiment, a message is displayed in message body window 314 during a process of composing a message in a way that is substantially similar to the message as displayed by an application on a receiving client device. In one embodiment, the message displayed when composing a message may include commands specifying a message appearance, such that the commands are not displayed by an application on a receiving client device.

As illustrated in FIG. 3, message body window 314 includes an example of a message, in accordance with an embodiment of the invention. The message includes text items 316 and a graphic image 318, wherein the graphic image 318 is displayed "inline" with the text items 316. In accordance with the invention, a message may include any number of text items and any number of graphic images, each of which may be combined in a variety of ways.

Generally, a user of a client device may compose a message by using the commands and components described herein to place text, graphics, or combinations thereof, into message body area 314. The user may specify one or more recipients of a message, such as by using "To" button 306 or associated text box 307. After composing a message, a user may initiate sending of the message by selecting "send" button 304. Actions associated with sending of a message are described in further detail in FIG. 4 and text herein.

FIG. 4 is a logical flow diagram generally showing one embodiment of a process 400 for composing and sending a message from a client device, such as client device 102 or 106 of FIG. 1. Process 400 may employ at least a portion of the system illustrated in FIG. 1. It may employ any of the system variations as discussed herein, or it may be performed with other systems. In one embodiment, all, or at least a portion of the actions of process 400 may be performed by client device 200 of FIG. 2. In one embodiment, a portion of the actions of process 400 are performed by client device 102 and a portion of the actions are performed by mail server 104 of FIG. 1.

Process 400 begins, after a start block, at block 402, where a new message is initiated. In one embodiment, the message is an email message. In various embodiments, the message may be an SMS message, instant message, or other type of message. Initiating a message may include a user entering a command in a client application such as a browser, creation of a window, such as message body window 314, initialization of various data fields, selection of one or more receivers, and the like.

Process flow may then proceed to decision block 404, where a determination is made of whether to edit text or a graphic. This determination may be made in a number of ways, and may differ based on a user interface employed. In one embodiment, the determination is based on where a user may position a point or cursor within the message body window 314. In one embodiment, a user may invoke a command to create a new text string or a new graphic, edit an existing text string or graphic, convert a text string to a graphic, or the like.

If the determination at block 404 is to edit text, process flow may proceed to block 406, where editing of text is performed. Editing text, as used herein, refers to creating new text, importing existing text, revising existing text, specifying or modifying a format or other characteristic of text. A keyboard, a pointing device, an audio input, or other input mechanism may be used to edit text.

If the determination at block 404 is to edit a graphic, process flow may proceed to block 408, where editing of a graphic is performed. Editing a graphic, as used herein, refers to creating a new graphic, importing a graphic, revising an existing graphic, specifying or modifying a format or other characteristic of a graphic. A keyboard, a pointing device, an audio input, or other input mechanism may be used to edit text.

Editing a graphic or text may include displaying the graphic or text, or combination thereof, in a presentation format substantially similar to a desired appearance of the message. That is, text or graphics may appear interleaved inline in a message body window. This may be referred to as a "what you see is what you get" (WYSIWYG) editing.

Following block 406 or 408, process may flow to decision block 410, where a determination is made of whether composing the message is complete. This determination may be based on a user selection of a command, such as a send command, a command to close a window, or other command. The determination may be based on a user continuing to edit text or a graphic, or a user beginning editing of a different text or graphic. The determination may be based on an expiration of an amount of time designated for composing a message. The determination may be based on a signal, command, or input from a process or computing device.

If, at block 410, it is determined that composing the message is not complete, process may flow to block 404, where a determination is made of editing text or a graphic. If, at block 410, it is determined that composing the message is complete, process may flow to block 412, where sending the composed message is initiated. Sending a message may include one or more of a number of actions, such as actions discussed herein or other actions.

Process may flow to block 414, where any graphics to be included with the message are combined with the message. In one embodiment, a graphic is made into an attachment by packaging the graphic element in a block of memory or a file, and combining the block or file with the message. In one embodiment, an attachment is created for each graphic element. In one embodiment, two or more graphic elements may be included in a single attachment. In one embodiment, one or more attachments may be included as a part of a multi-part message. In one embodiment, a graphic element may be inserted inline with text in a message. One or more text strings may be interleaved with one or more graphic elements, in an ordering corresponding to an ordering as viewed in the message body window during composing of the message. As used herein, the term "message" may include one or more text or graphic elements included with a message.

Process may then flow to block 416, where the message is transmitted. In one embodiment, this includes transmitting the message to a mail server, such as mail server 104 of FIG. 1. In various embodiments, transmitting a message includes transmitting the message to an SMS server, an instant messaging server, or other intermediary servers that facilitate a transmission of messages. In one embodiment, a message may be transmitted to a receiving client device without first passing through a facilitating message server. A transmitted message may employ a network, such as network 110 of FIG. 1 to facilitate transmission. In one embodiment, transmitting the message may include waiting a period of time prior to transmitting the message to a remote device.

Process 400 may then return to a calling program.

In one embodiment, a mail server may perform at least a portion of the actions of block 416. A client device, such as client device 102 of FIG. 1, may send the message, including text and graphics to a mail server, such as mail server 104. A mail server may receive the message and create an attachment for each graphic element. In one embodiment, a mail server may transform the message into a message substantially conforming to an email protocol, such as MIME. The mail server may send the transformed message to a recipient. In one embodiment, the message may be sent from client device 102 to a webmail server, using HTTP to send all or at least a portion, of the message. In one embodiment, the message may be sent to a mail server using SMTP.

In one embodiment, a transmitted message may be received by a message server, such as mail server 104 of FIG. 1. A message server may store the message temporarily or indefinitely. A message server may notify a message recipient, such as client device 106 of FIG. 1, that the recipient has a message to be received. In one embodiment, the recipient may query the message server to determine whether a message to be delivered is being stored.

FIG. 5 is a logical flow diagram generally showing one embodiment of a process 500 for receiving and processing a message, such as a message composed as illustrated in FIG. 4 and described herein. Process 500 may employ at least a portion of the system illustrated in FIG. 1. It may employ any of the system variations as discussed herein, or it may be performed with other systems.

Process 500 begins, after a start block, at block 502, where a message is received from a remote device, such as client device 102 of FIG. 1. As discussed above, the message may be received directly or indirectly, such as by employing a message server to process, store, or forward the message. In one embodiment, receiving a message may include receiving the message from a webmail server. The message may be included in a web page transmitted using HTTP. In one embodiment, the message may be received using SMTP.

Process may then flow to decision block 504 where a determination is made of whether the received message has an associated attached graphic. The first time the actions of block 504 are performed with respect to a message, the determination is of whether a first attached graphic exists. In subsequent times, the determination is of whether another attached graphic exists.

If, at block 504, a determination is made that a first, or another, attached graphic exists, process may flow to block 506, where the attached graphic is retrieved. In one embodiment, retrieving an attachment may include requesting and receiving the attachment from a message server, such as email server 104 of FIG. 1, or another server, or the sending client device. In one embodiment, retrieving the attachment may include retrieving the attachment from a location in memory of the receiving client device.

Process may then flow to block 508, where the retrieved graphic is inserted into a message body. The message body may have zero, one, or more elements contained therein. Other elements may include text or graphics. In one embodiment, inserting a graphic element into a message body includes determining a location within the message body and inserting the graphic element at the determined location, where the location corresponds to a location of the graphic element in the message body window 314 (FIG. 3) of the sending client device. In one embodiment, the message, or at least a portion thereof, is formatted in HTML. In one embodiment, each graphic element is embedded in the message in an HTML format.

Process flow may then proceed to decision block 504, where a determination of another attached graphic is performed. If, at block 504, it is determined that there is not another attached graphic, process may then flow to block 510, where the message is displayed on a client device, such as receiving client device 106 of FIG. 1. In one embodiment, the message displayed on the receiving client device is substantially similar to the message as displayed on the sending client device during composing of the message.

Process 500 may then return to a calling program.

In response to receiving a message, and upon performing at least a portion of the process 500 of FIG. 5, a user of a receiving client device may reply to the sending device or forward the received message to another client device. The user may edit the message in a number of ways. In one embodiment, the receiver may employ a receiving client device to perform at least a portion of the process 400 of FIG. 4 as described herein. This may include editing text or graphic elements received in the message, creating new text or graphic elements, or deleting text or graphic elements. In one embodiment, a receiving client device provides substantially similar functionality for composing, editing, and transmitting a reply message, as described herein for a sending client device. This may include viewing and editing text and graphics inline, or in a WYSIWYG manner.

Following editing a message, a receiver may transmit the message back to the original sender, or to one or more other receivers. In one embodiment, actions of editing, sending, receiving, editing, and sending may be repeated indefinitely, among two or more clients, to maintain a conversation. Prior to sending each message, a client may have an option of adding or removing one or more recipients from a list of recipients participating in the conversation. This may provide a group of two or more clients with an ability to make revisions to one or more graphics or text as part of a process of collaboration.

In one embodiment, a recipient of a message may place a copy of any graphic or text in a file or program, by employing actions such as cut, copy, paste, save, save as, and the like.

It will be understood that each block of the flowchart illustrations of FIGS. 4 and 5, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustrations may also be performed concurrently with other blocks or combinations of blocks, or even in a different sequence than illustrated without departing from the scope or spirit of the invention.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method comprising:
   receiving, by a server, a request from a first device, the first device executing a browser application, the first device requesting access to a web page associated with an electronic document accessible via the browser application;
   providing, via the server to the first device, access to the web page;
   receiving, by the server from the first device, edits to the electronic document, such that the electronic document is updated based on said edits;
   receiving, by the server, a request from a second device for access to the web page from a browser application executing on the second device;
   providing, via the server to the second device, access to the web page, said access to the second device comprising providing the updated electronic document;
   receiving, by the server via the web page access providing the updated electronic document to the second device, edits to the updated electronic document from the second device;
   updating, by the server, the electronic document again based on the edits from the second device; and
   automatically updating, by the server in response to the edits from the second device, the web page displayed within the browser application of the first device thereby displaying the electronic document's content that is based on the edits performed by the second device.

2. The method of claim 1, wherein said updating comprising storing the updated electronic document.

3. The method of claim 1, wherein said edits by the first device are performed inline.

4. The method of claim 1, wherein said electronic document and the updated electronic document are accessible via a user interface (UI) associated with the web page.

5. The method of claim 1, wherein said electronic document corresponds to a web-based message.

6. The method of claim 5, wherein said access to said second device is provided prior to transmission of the web-based message.

7. The method of claim 1, wherein said edits comprise modification of content included within the electronic document.

8. The method of claim 1, wherein said content is selected from a group consisting of: text, graphics, media files, images, multi-media and videos.

9. A non-transitory computer-readable storage medium tangibly encoded with computer-executable instructions, that when executed by a server, performs a method comprising:
   receiving, by the server, a request from a first device, the first device executing a browser application, the first device requesting access to a web page associated with an electronic document accessible via the browser application;
   providing, via the server to the first device, access to the web page;
   receiving, by the server from the first device, edits to the electronic document, such that the electronic document is updated based on said edits;
   receiving, by the server, a request from a second device for access to the web page from a browser application executing on the second device;
   providing, via the server to the second device, access to the web page, said access to the second device comprising providing the updated electronic document;
   receiving, by the server via the web page access providing the updated electronic document to the second device, edits to the updated electronic document from the second device;
   updating, by the server, the electronic document again based on the edits from the second device; and
   automatically updating, by the server in response to the edits from the second device, the web page displayed within the browser application of the first device thereby displaying the electronic document's content based on the edits performed by the second device.

10. The non-transitory computer-readable storage medium of claim 9, wherein said updating comprising storing the updated electronic document.

11. The non-transitory computer-readable storage medium of claim 9, wherein said edits by the first device are performed inline.

12. The non-transitory computer-readable storage medium of claim 9, wherein said electronic document and the updated electronic document are accessible via a user interface (UI) associated with the web page.

13. The non-transitory computer-readable storage medium of claim 9, wherein said electronic document corresponds to a web-based message, wherein said access to said second device is provided prior to transmission of the web-based message.

14. The non-transitory computer-readable storage medium of claim 9, wherein said edits comprise modification of content included within the electronic document, wherein said content is selected from a group consisting of: text, graphics, media files, images, multi-media and videos.

15. A server comprising:
   a processor configured to:
     receive a request from a first device, the first device executing a browser application, the first device requesting access to a web page associated with an electronic document accessible via the browser application;
     provide access to the first device to the web page;
     receive, from the first device, edits to the electronic document, such that the electronic document is updated based on said edits;
     receive a request from a second device for access to the web page from a browser application executing on the second device;
     provide access to the second device to the web page, said access to the second device comprising providing the updated electronic document;
     receive, via the web page access providing the updated electronic document to the second device, edits to the updated electronic document from the second device;
     update the electronic document again based on the edits from the second device; and
     automatically update, in response to the edits from the second device, the web page displayed within the browser application of the first device thereby displaying the electronic document's content based on the edits performed by the second device.

* * * * *